Patented Sept. 30, 1930

1,777,044

UNITED STATES PATENT OFFICE

RENÉ ANDRÉ LEGENDRE, OF PARIS, FRANCE

PRESERVATION OF GRAIN AND THE LIKE

No Drawing. Original application filed March 22, 1928, Serial No. 263,966, and in France April 2, 1927. Divided and this application filed January 21, 1929. Serial No. 334,123.

This application is a division of my prior application, Serial 263,966, filed March 22nd, 1928, which resulted in Patent No. 1,702,735, granted February 19, 1929.

The present invention relates to improvements in the preservation of flour, grain, grain by-products or the like (i. e. cracked grains, intermediate and final mill-products, shorts, bran, etc.) and, more particularly, to processes for preventing the alterations in such products which begin in the non-intact cells or grains, under the action of intrinsic or extrinsic moisture, and which is thereafter propagated throughout the mass thereof.

One of the objects of the invention is to modify the hydrogen concentration of the moisture adhering to, and associated with the product to be preserved (and, more particularly, that of the non-intact cells) so that the Sorensen pH is above 7 and, preferably, has some value lying between 8 and 10 (the Sorensen pH is here taken, as usual, to represent the logarithm of the reciprocal of the hydrogen ion concentration).

Other objects will appear in the course of the detailed description which follows below.

The fermentation and other deteriorating processes taking place in grains, flour, mill-products and the like is known to be at a maximum when the moisture associated therewith contains hydrogen ions at a concentration of approximately pH=5. To preserve such materials the pH may be raised by means (1) of a base which is neither toxic nor capable of engendering toxic substances in contact with the material being treated or (2) of a compound formed of a weak acid and a strong base, (preferably salts of sodium or calcium) or (3) of a mixture of compounds of the nature specified under (1) and (2).

One convenient method of carrying out the invention is to treat the product to be preserved with an alkaline gas such as ammonia. This may be done, by passing the product into a closed conduit fitted with a screw conveyor or other conveying and agitating device and liberating gaseous ammonia from a tank containing liquid ammonia so that the gas current moves in the opposite direction to that of the product under treatment. In actual practice, as little as 150 grams of ammonia per metric ton suffices to obtain effective preservation.

Another mode of procedure is to treat each metric ton of the product to be preserved with a solution containing 100–300 grams of an alkaline salt or of a mixture of equal parts of a salt and a base dissolved in 10 liters of water. Solutions of sodium carbonate may be employed, preferably, and are mixed with the product by directing an atomized jet on the latter.

The foregoing methods i. e. treatment with a gas or a liquid apply, more especially, but not exclusively to products containing cracked or non-intact grains or cells. When the product is a whole grain and it is desired to exclude additional moisture, a solid preservative material may be used containing a pulverized mixture of bases and of salts of weak acids in equal proportions. A mixture made up of lime, calcium carbonate and sodium carbonate has been found to give good results and may be introduced into the product to be preserved by any convenient form of mixing or kneading machine.

The invention, applied to whole grains, has been found to arrest the development of microorganisms and prevent the heating and alterations due to the latter without modifying in the least the germinating property. Moreover, the deteriorating effects due to insects appear to be arrested. Flour, treated as described, is preserved and its baking quality retained unaltered. In the case of hulls, bran, shorts and similar mill-products or by-products, heating, moulding and agglomeration are prevented and a perfectly stable product is obtained.

This invention relates to the preservation of grain and seed products generally. For the purpose of this invention, and in construing the appended claims, the word "grain" includes not only whole grains but also hulls, bran, cracked grains, and similar by products. The preservative material may be applied in any physical state and in the form of any chemical compound capable to effecting the hydrogen ion changes hereinabove mentioned and described.

What I claim is:—

1. A process for the preservation of grain which comprises adjusting the hydrogen ion concentration of the adherent moisture to a point within the range pH 7–10 by treating said grain with an alkaline-reacting gas.

2. A process for the preservation of grain which comprises adjusting the hydrogen ion concentration of the adherent moisture to a point within the range pH 7–10 by treating said grain with ammonia gas.

3. A process for the preservation of grain which comprises treating said grain with about 150 grams of gaseous ammonia per metric ton and permitting said ammonia to be absorbed in the moisture adherent to said grain to adjust the hydrogen ion concentration of said moisture to a point within the range pH 7–10.

4. A process for the preservation of grain which comprises passing said grain in intimate contact with an atmosphere containing an alkaline-reacting gas until the moisture adherent to said grain has a hydrogen ion concentration within the range pH 7–10.

In testimony whereof, I have signed my name to this specification this fourth day of January, 1929.

RENÉ ANDRÉ LEGENDRE.